(12) United States Patent
Ahmed

(10) Patent No.: US 12,350,652 B1
(45) Date of Patent: Jul. 8, 2025

(54) CUMg$_{0.5}$Mn$_{1.5}$O$_4$/CuO NANOCOMPOSITE MATERIAL AND METHOD OF MAKING

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/037,084

(22) Filed: Jan. 25, 2025

(51) Int. Cl.
| | |
|---|---|
| *B01J 35/40* | (2024.01) |
| *B01J 20/04* | (2006.01) |
| *B01J 20/28* | (2006.01) |
| *B01J 20/30* | (2006.01) |
| *B01J 23/00* | (2006.01) |
| *B01J 23/72* | (2006.01) |
| *B01J 23/889* | (2006.01) |
| *B01J 35/30* | (2024.01) |
| *B01J 35/45* | (2024.01) |
| *B01J 37/04* | (2006.01) |
| *B01J 37/08* | (2006.01) |

(52) U.S. Cl.
CPC ......... *B01J 23/8892* (2013.01); *B01J 20/041* (2013.01); *B01J 20/28004* (2013.01); *B01J 20/28007* (2013.01); *B01J 20/28016* (2013.01); *B01J 20/3078* (2013.01); *B01J 20/3085* (2013.01); *B01J 23/002* (2013.01); *B01J 23/72* (2013.01); *B01J 35/393* (2024.01); *B01J 35/394* (2024.01); *B01J 35/40* (2024.01); *B01J 35/45* (2024.01); *B01J 37/04* (2013.01); *B01J 37/086* (2013.01); *B01J 37/088* (2013.01); *B01J 2523/17* (2013.01); *B01J 2523/22* (2013.01); *B01J 2523/72* (2013.01)

(58) Field of Classification Search
CPC . B01J 35/393; B01J 35/40; B01J 35/33; B01J 21/063; B01J 23/06; B01J 23/14; B01J 37/036; B01J 37/04; B01J 37/08
See application file for complete search history.

(56) References Cited

U.S. PATENT DOCUMENTS

2005/0271941 A1   12/2005   Bushong et al.

FOREIGN PATENT DOCUMENTS

| CN | 101367045 A | 2/2009 |
| CN | 112547085 A | 3/2021 |
| JP | 5387318 B2 | 1/2014 |
| WO | 2017/119494 A1 | 7/2017 |
| WO | 2020/004751 A1 | 1/2020 |

OTHER PUBLICATIONS

Vandenberghe et al., Acta Crystallographica Section B: Structure Science, Crystal Engineering and Materials, (1976), 32(10), 2796-2798. (Disclosed in IDS).*

Ishtihadah Islam, et al., "Effect of 3d transition metal doping (Co, Ni and Cu) on structural, optical, morphological and dielectric properties of sol-gel assisted auto-combusted Mg0.95Mn0.05O nanoparticles", Journal of Material Science: Materials in Electronics (2018), vol. 29, 01 Dec. 1, 2017, pp. 3952-3956.

R. E. Vandenberghe, et al., "Neutron Diffraction Study of the Cation Ordering in Cu1.5Mn1.5O4 and CuMg0.5Mn1.5O4", Acta Crystallographica Section B: Structural Science, Crystal Engineering and Materials, vol. 32, Issue 10, Oct. 1976, pp. 2796-2798.

\* cited by examiner

*Primary Examiner* — Yong L Chu
(74) *Attorney, Agent, or Firm* — Oblon, McClelland, Maier & Neustadt, L.L.P.

(57) ABSTRACT

A CuMg$_{0.5}$Mn$_{1.5}$O$_4$/CuO nanocomposite material includes a cubic CuMg$_{0.5}$Mn$_{1.5}$O$_4$ crystalline phase; a monoclinic CuO crystalline phase; and a monoclinic CuO crystalline phase. The average crystallite size of the CuMg$_{0.5}$Mn$_{1.5}$O$_4$/CuO nanocomposite material is in a range from 50 to 90 nm.

20 Claims, 6 Drawing Sheets

$CuMg_{0.5}Mn_{1.5}O_4/CuO$ NANOCOMPOSITE MATERIAL AND METHOD OF MAKING

BACKGROUND

Technical Field

The present disclosure is directed to nanocomposites, more particularly, to a $CuMg_{0.5}Mn_{1.5}O_4/CuO$ nanocomposite material fabricated using a Pechini sol-gel method.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

The present disclosure builds on the existing body of knowledge surrounding mixed metal oxide nanocomposites and the Pechini sol-gel synthesis method, addressing specific gaps and limitations in current technologies. Previous studies in this field have focused on synthesizing metal oxide composites for various applications, but many approaches are hindered by complex procedures, high energy consumption, and poor control over particle morphology and elemental distribution. For instance, conventional methods often fail to achieve uniform crystallinity and size distribution in mixed metal oxide nanocomposites, leading to inconsistent performance in practical applications such as catalysis, sensing, and environmental remediation.

Accordingly, an object of the present disclosure is develop a $CuMg_{0.5}Mn_{1.5}O_4/CuO$ nanocomposite, fabricated using a Pechini sol-gel method, that combines the desirable properties of $CuMg_{0.5}Mn_{1.5}O_4$ and CuO, tailored through a cost-effective and scalable process, by circumventing the drawbacks of the art, such as particle agglomeration and phase stability.

SUMMARY

In an exemplary embodiment, a $CuMg_{0.5}Mn_{1.5}O_4/CuO$ nanocomposite material is described. The $CuMg_{0.5}Mn_{1.5}O_4/CuO$ nanocomposite material includes a cubic $CuMg_{0.5}Mn_{1.5}O_4$ crystalline phase, and a monoclinic CuO crystalline phase, wherein an average crystallite size of the $CuMg_{0.5}Mn_{1.5}O_4/CuO$ nanocomposite material is in a range from 50 to 90 nm.

In some embodiments, the average crystallite size of the $CuMg_{0.5}Mn_{1.5}O_4/CuO$ nanocomposite material is in a range from 50 to 70 nm.

In some embodiments, the average crystallite size of the $CuMg_{0.5}Mn_{1.5}O_4/CuO$ nanocomposite material is in a range from 55 to 65 nm.

In some embodiments, the average crystallite size of the $CuMg_{0.5}Mn_{1.5}O_4/CuO$ nanocomposite material is in a range from 65 to 85 nm.

In some embodiments, the average crystallite size of the $CuMg_{0.5}Mn_{1.5}O_4/CuO$ nanocomposite material is in a range from 72 to 82 nm.

In some embodiments, the $CuMg_{0.5}Mn_{1.5}O_4/CuO$ nanocomposite material has a granular morphology comprising granular particles with an average diameter in a range from 75 to 475 nm.

In some embodiments, the $CuMg_{0.5}Mn_{1.5}O_4/CuO$ nanocomposite material has a granular morphology comprising granular particles with an average diameter in a range from 100 to 160 nm.

In some embodiments, the $CuMg_{0.5}Mn_{1.5}O_4/CuO$ nanocomposite material has a granular morphology comprising granular particles with an average diameter in a range from 130 to 140 nm.

In some embodiments, the $CuMg_{0.5}Mn_{1.5}O_4/CuO$ nanocomposite material has a granular morphology comprising granular particles with an average diameter in a range from 350 to 450 nm.

In some embodiments, the $CuMg_{0.5}Mn_{1.5}O_4/CuO$ nanocomposite material has a granular morphology comprising granular particles with an average diameter in a range from 390 to 410 nm.

In some embodiments, the atomic concentration of copper in the $CuMg_{0.5}Mn_{1.5}O_4/CuO$ nanocomposite material is in a range from 18 to 25 atomic % (at. %), the atomic concentration of manganese in the $CuMg_{0.5}Mn_{1.5}O_4/CuO$ nanocomposite material is in a range from 22 to 29 at. %, and the atomic concentration of magnesium in the $CuMg_{0.5}Mn_{1.5}O_4/CuO$ nanocomposite material is in a range from 11 to 17 at. %.

In some embodiments, the atomic concentration of copper in the $CuMg_{0.5}Mn_{1.5}O_4/CuO$ nanocomposite material is in a range from 23 to 25 at. %, the atomic concentration of manganese in the $CuMg_{0.5}Mn_{1.5}O_4/CuO$ nanocomposite material is in a range from 24 to 26 at. %, and the atomic concentration of magnesium in the $CuMg_{0.5}Mn_{1.5}O_4/CuO$ nanocomposite material is in a range from 12.5 to 13.75 at. %.

In some embodiments, the atomic concentration of copper in the $CuMg_{0.5}Mn_{1.5}O_4/CuO$ nanocomposite material is in a range from 19 to 21 at. %, the atomic concentration of manganese in the $CuMg_{0.5}Mn_{1.5}O_4/CuO$ nanocomposite material is in a range from 27 to 29 at. %, and the atomic concentration of magnesium in the $CuMg_{0.5}Mn_{1.5}O_4/CuO$ nanocomposite material is in a range from 14 to 15.5 at. %.

In an exemplary embodiment, a method of making the $CuMg_{0.5}Mn_{1.5}O_4/CuO$ nanocomposite material is described. The method includes adding a tartaric acid solution to a solution of magnesium nitrate hexahydrate ($Mg(NO_3)_2 \cdot 6H_2O$), manganese acetate tetrahydrate ($Mn(CH_3COO)_2 \cdot 4H_2O$), and copper acetate monohydrate ($Cu(CH_3COO)_2$—$H_2O$) under stirring to form a reaction mixture, adding polyethylene glycol 400 to the reaction mixture to form a stabilized mixture and stirring at 250° C. until complete evaporation of water, forming a solid, and calcining the solid at a temperature in a range from 550 to 850° C. for 2 to 4 hours to form the $CuMg_{0.5}Mn_{1.5}O_4/CuO$ nanocomposite material.

In some embodiments, the solid is calcined at a temperature in a range from 575 to 625° C. for 2 to 4 hours to form the $CuMg_{0.5}Mn_{1.5}O_4/CuO$ nanocomposite material.

In some embodiments, the solid is calcined at 600° C. for 3 hours to form the $CuMg_{0.5}Mn_{1.5}O_4/CuO$ nanocomposite material.

In some embodiments, the solid is calcined at a temperature in a range from 775 to 825° C. for 2 to 4 hours to form the $CuMg_{0.5}Mn_{1.5}O_4/CuO$ nanocomposite material.

In some embodiments, the solid is calcined at 800° C. for 3 hours to form the $CuMg_{0.5}Mn_{1.5}O_4/CuO$ nanocomposite material.

In some embodiments, the concentration of tartaric acid in the reaction mixture is in a range from 190 to 200 g/L, the concentration of $Mg(NO_3)_2 \cdot 6H_2O$ in the reaction mixture is in a range from 95 to 105 g/L, the concentration of $Mn(CH_3COO)_2 \cdot 4H_2O$ in the reaction mixture is in a range from 95 to 105 g/L, and the concentration of $Cu(CH_3COO)_2 \cdot H_2O$ in the reaction mixture is in a range from 95 to 105 g/L.

In some embodiments, the concentration of polyethylene glycol 400 in the stabilized mixture is in a range from 65 to 75 ml per liter of stabilized mixture.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'nanocomposite' refers to a material composed of at least two different components: a matrix and nanoparticles that are incorporated into or dispersed within the matrix. The nanoparticles typically have at least one dimension in the nanometre range (typically 1 to 100 nm) and are used to enhance or modify the properties of the matrix material. Nanocomposites can exhibit unique mechanical, electrical, thermal, optical, or chemical properties that are distinct from those of the individual components. The matrix can be made from various materials such as polymers, metals, ceramics, or carbon-based substances, while the nanoparticles can be made of metals, metal oxides, ceramics, carbon nanotubes, or other nanomaterials.

As used herein, the term 'average crystallite size' refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometres (nm) and reflects the typical dimensions of the crystalline regions in the material, excluding any amorphous regions or defects.

As used herein, the term 'atomic concentration' refers to the proportion or percentage of a specific element in a material, calculated based on the number of atoms of that element relative to the total number of atoms present in the material. It is typically expressed as a percentage (at. %) or as an atomic fraction. Atomic concentration provides insight into the composition of the material, reflecting the relative abundance of a particular element within a mixture or compound. This measurement is often determined using techniques such as X-ray fluorescence (XRF), energy-dispersive X-ray spectroscopy (EDS), or inductively coupled plasma mass spectrometry (ICP-MS).

As used herein, the term 'room temperature' refers to a temperature range of '23 degrees Celsius (° C.)±2° C. in the present disclosure. As used herein, 'ambient conditions' means the temperature and pressure of the surroundings in which the substance, composition or article is located.

As used herein, the term 'X-ray diffraction' or 'XRD' or 'X-ray crystallography' refers to basic technique for obtaining information on the atomic structure of crystalline materials used as a standard laboratory technique. Unless otherwise specified, the XRD shall include an analytical technique based on the diffraction of X-rays by matter, including for crystalline materials.

As used herein, the term 'Scanning Electron Microscopy' or 'SEM' refers to a surface-imaging technique that produces images of a sample by scanning the sample with a focused beam of electrons. Unless otherwise specified, the SEM shall include all imaging techniques using electron beams for imaging.

As used herein, the term 'median volume particle size (Dv50)' refers to the maximum particle diameter below which 50% of the sample volume exists. Unless otherwise indicated the Dv50 shall have the standard definition as per ISO guidelines.

As used herein, the term 'pore diameter' refers to pore size of nanocomposite material based on pore classification of the International Union of Pure and Applied Chemistry (IUPAC). The size measurement and nomenclature such as mesopores, micropores, or macropores will be applicable wherever necessary accordingly unless otherwise indicated in the disclosure.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., 1° C.

Aspects of the present disclosure are directed to a $CuMg_{0.5}Mn_{1.5}O_4$/CuO nanocomposite synthesized using the Pechini sol-gel method, offering a cost-effective and scalable process with controlled crystallinity, morphology, and improved stability, making it suitable for advanced applications in mixed metal oxide materials. A $CuMg_{0.5}Mn_{1.5}O_4$/CuO nanocomposite material is described. In some embodiments, the nanocomposite material may include crystalline phases, but is not limited to quartz, calcite, hematite, magnetite, goethite, dolomite, albite, anorthite, pyrite, fluorite, halite, barite, apatite, rutile, and zircon. In a preferred embodiment, the $CuMg_{0.5}Mn_{1.5}O_4$/CuO nanocomposite exhibits a cubic $CuMg_{0.5}Mn_{1.5}O_4$ crystalline phase, and a monoclinic CuO crystalline phase.

In some embodiments, the average crystallite size of the $CuMg_{0.5}Mn_{1.5}O_4$/CuO nanocomposite material is within the range of 20 to 150 nm, 30 to 120 nm, preferably 50 to 90 nm, including subranges such as 50-51 nm, 51-52 nm, 52-53 nm, 53-54 nm, 54-55 nm, 55-56 nm, 56-57 nm, 57-58 nm, 58-59 nm, 59-60 nm, 60-61 nm, 61-62 nm, 62-63 nm, 63-64 nm, 64-65 nm, 65-66 nm, 66-67 nm, 67-68 nm, 68-69 nm, 69-70 nm, 70-71 nm, 71-72 nm, 72-73 nm, 73-74 nm, 74-75 nm, 75-76 nm, 76-77 nm, 77-78 nm, 78-79 nm, 79-80 nm, 80-81 nm, 81-82 nm, 82-83 nm, 83-84 nm, 84-85 nm, 85-86 nm, 86-87 nm, 87-88 nm, 88-89 nm, 89-90 nm. In a preferred embodiment, the average crystallite size is 60.78 nm and 77.62 nm for samples synthesized at 600° C. and 800, respectively.

In some embodiments, the morphology of the nanocomposite material includes diverse nanostructures such as nanowires, nanospheres, nanosheets, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures. In a preferred embodiment, the nanocomposite material nanocomposite material has a granular morphology.

In some embodiments, the $CuMg_{0.5}Mn_{1.5}O_4$/CuO nanocomposite material demonstrates a granular morphology with granular particles having an average diameter ranging from 20 to 650 nm, 50 to 550 nm, preferably 75 to 475 nm. Specific subranges include 75-80 nm, 80-85 nm, 85-90 nm, 90-95 nm, 95-100 nm, 100-105 nm, 105-110 nm, 110-115 nm, 115-120 nm, 120-125 nm, 125-130 nm, 130-135 nm, 135-140 nm, 140-145 nm, 145-150 nm, 150-155 nm, 155-160 nm, 160-165 nm, 165-170 nm, 170-175 nm, 175-180 nm, 180-185 nm, 185-190 nm, 190-195 nm, 195-200 nm, 200-205 nm, 205-210 nm, 210-215 nm, 215-220 nm, 220-225 nm, 225-230 nm, 230-235 nm, 235-240 nm, 240-245 nm, 245-250 nm, 250-255 nm, 255-260 nm, 260-265 nm, 265-270 nm, 270-275 nm, 275-280 nm, 280-285 nm, 285-290 nm, 290-295 nm, 295-300 nm, 300-305 nm, 305-310 nm, 310-315 nm, 315-320 nm, 320-325 nm, 325-330 nm, 330-335 nm, 335-340 nm, 340-345 nm, 345-350 nm, 350-355 nm, 355-360 nm, 360-365 nm, 365-370 nm, 370-375 nm, 375-380 nm, 380-385 nm, 385-390 nm, 390-395 nm, 395-400 nm, 400-405 nm, 405-410 nm, 410-415 nm, 415-420 nm, 420-425 nm, 425-430 nm, 430-435 nm, 435-440 nm, 440-445 nm, 445-450 nm, 450-455 nm, 455-460 nm, 460-465 nm, 465-470 nm, 470-475 nm. In a preferred embodiment, the average diameter of the granular particles is 136.68 nm and 399.69 nm for samples synthesized at 600° C. and 800, respectively.

In some embodiments, the atomic concentration of copper in the nanocomposite material ranges from 12 to 30 at. %, 14 to 25 at %., preferably 18 to 21 at. %, including 18-18.1 at. %, 18.1-18.2 at. %, 18.2-18.3 at. %, 18.3-18.4 at. %, 18.4-18.5 at. %, 18.5-18.6 at. %, 18.6-18.7 at. %, 18.7-18.8 at. %, 18.8-18.9 at. %, 18.9-19 at. %, 19-19.1 at. %, 19.1-19.2 at. %, 19.2-19.3 at. %, 19.3-19.4 at. %, 19.4-19.5 at. %, 19.5-19.6 at. %, 19.6-19.7 at. %, 19.7-19.8 at. %, 19.8-19.9 at. %, 19.9-20 at. %, 20-20.1 at. %, 20.1-20.2 at. %, 20.2-20.3 at. %, 20.3-20.4 at. %, 20.4-20.5 at. %, 20.5-20.6 at. %, 20.6-20.7 at. %, 20.7-20.8 at. %, 20.8-20.9 at. %, 20.9-21 at. %, 18-19 at. %, 18.1-19.1 at. %, 18.2-19.2 at. %, 18.3-19.3 at. %, 18.4-19.4 at. %, 18.5-19.5 at. %, 19-20 at. %, 19.5-20.5 at. %, 20-21 at. %. In a preferred embodiment, the atomic concentration of copper in the nanocomposite material is 23.80 at. % and 20.20 at. % for samples synthesized at 600° C. and 800, respectively of the total number of atoms.

In some embodiments, the atomic concentration of magnesium in the nanocomposite material ranges from 5 to 30 at. %, 8 to 25 at %., preferably 11 to 17 at. %, with subranges such as 11-11.2 at. %, 11.2-11.4 at. %, 11.4-11.6 at. %, 11.6-11.8 at. %, 11.8-12 at. %, 12-12.2 at. %, 12.2-12.4 at. %, 12.4-12.6 at. %, 12.6-12.8 at. %, 12.8-13 at. %, 13-13.2 at. %, 13.2-13.4 at. %, 13.4-13.6 at. %, 13.6-13.8 at. %, 13.8-14 at. %, 14-14.2 at. %, 14.2-14.4 at. %, 14.4-14.6 at. %, 14.6-14.8 at. %, 14.8-15 at. %, 15-15.2 at. %, 15.2-15.4 at. %, 15.4-15.6 at. %, 15.6-15.8 at. %, 15.8-16 at. %, 16-16.2 at. %, 16.2-16.4 at. %, 16.4-16.6 at. %, 16.6-16.8 at. %, 16.8-17 at. %, 11-12 at. %, 11.2-12.2 at. %, 11.4-12.4 at. %, 11.6-12.6 at. %, 12-13 at. %, 12.2-13.2 at. %, 12.4-13.4 at. %, 12.6-13.6 at. %.

In a preferred embodiment, the atomic concentration of magnesium is 13.30 at. % and 14.60 at. % for samples synthesized at 600° C. and 800, respectively of the total number of atoms.

In some embodiments, the atomic concentration of manganese in the nanocomposite material ranges from 10 to 40 at. %, 15 to 30 at %., preferably 22 to 29 at. %, with subranges such as 22-22.5 at. %, 22.5-23 at. %, 23-23.5 at. %, 23.5-24 at. %, 24-24.5 at. %, 24.5-25 at. %, 25-25.5 at. %, 25.5-26 at. %, 26-26.5 at. %, 26.5-27 at. %, 27-27.5 at. %, 27.5-28 at. %, 28-28.5 at. %, 28.5-29 at. %, 22-23 at. %, 22.5-23.5 at. %, 23-24 at. %, 23.5-24.5 at. %, 24-25 at. %, 24.5-25.5 at. %, 25-26 at. %, 25.5-26.5 at. %, 26-27 at. %, 26.5-27.5 at. %, 27-28 at. %, 27.5-28.5 at. %, 28-29 at. %, 22-24 at. %, 22.5-24.5 at. %, 23-25 at. %, 23.5-25.5 at. %, 24-26 at. %, 24.5-26.5 at. %, 25-27 at. %, 25.5-27.5 at. %, 26-28 at. %, 26.5-28.5 at. %, 27-29 at. %. In a preferred embodiment, the atomic concentration of manganese is 24.90 at. % and 27.80 at. % for samples synthesized at 600° C. and 800, respectively of the total number of atoms.

In some embodiments, the atomic concentration of oxygen in the nanocomposite material ranges from 10 to 60 at. %, 20 to 50 at %., preferably 25 to 40 at. %, including 25-26 at. %, 26-27 at. %, 27-28 at. %, 28-29 at. %, 29-30 at. %, 30-31 at. %, 31-32 at. %, 32-33 at. %, 33-34 at. %, 34-35 at. %, 35-36 at. %, 36-37 at. %, 37-38 at. %, 38-39 at. %, 39-40 at. %, 25-27 at. %, 26-28 at. %, 27-29 at. %, 28-30 at. %, 29-31 at. %, 30-32 at. %, 31-33 at. %, 32-34 at. %, 33-35 at. %, 34-36 at. %, 35-37 at. %, 36-38 at. %, 37-39 at. %, 38-40 at. %, 25-28 at. %, 26-29 at. %, 27-30 at. %, 28-31 at. %, 29-32 at. %, 30-33 at. %, 31-34 at. %, 32-35 at. %, 33-36 at. %, 34-37 at. %, 35-38 at. %. In a preferred embodiment, the atomic concentration of oxygen in the nanocomposite material is 38.0 at. % and 37.40 at. % for samples synthesized at 600° C. and 800° C., respectively of the total number of atoms.

Figure 1A:
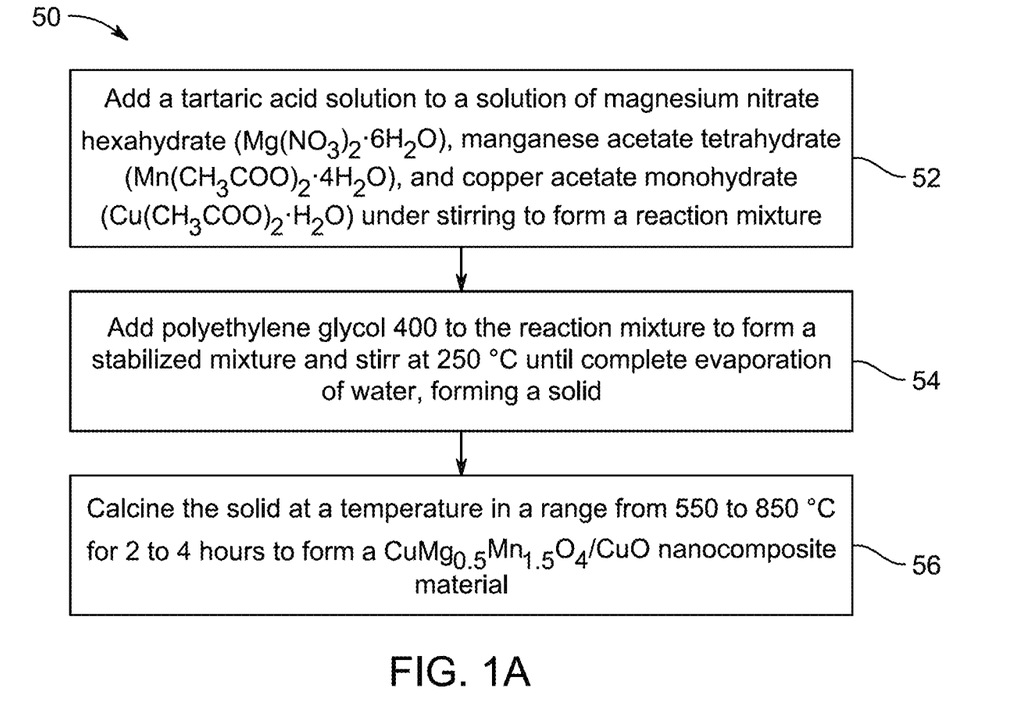
FIG. 1A is a method flowchart for making a $CuMg_{0.5}Mn_{1.5}O_4/CuO$ nanocomposite material, according to certain embodiments.

FIG. 1A illustrates a schematic flow chart of a method 50 of preparing the $CuMg_{0.5}Mn_{1.5}O_4/CuO$ nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes adding a tartaric acid solution to a solution of magnesium nitrate hexahydrate $(Mg(NO_3)_2 \cdot 6H_2O)$, manganese acetate tetrahydrate $(Mn(CH_3COO)_2 \cdot 4H_2O)$, and copper acetate monohydrate $(Cu(CH_3COO)_2 \cdot H_2O)$ under stirring to form a reaction mixture. In one or more embodiments, the solvent is water.

In some embodiments, magnesium salt may include, but is not limited to, magnesium chloride, magnesium sulfate, magnesium carbonate, magnesium oxide, magnesium fluoride, magnesium bromide, magnesium iodide, magnesium hydroxide, magnesium citrate, magnesium malate, magnesium lactate, magnesium gluconate, magnesium ascorbate, magnesium tartrate, magnesium perchlorate, magnesium phosphate, magnesium stearate, magnesium pyrophosphate, magnesium silicate, magnesium borate, magnesium nitrate, magnesium formate, magnesium acetate, magnesium hypophosphite, magnesium tungstate, magnesium thiosulfate, magnesium nitride, magnesium aluminate, and magnesium succinate. In a preferred embodiment, the magnesium salt is magnesium nitrate hexahydrate.

In some embodiments, manganese salt may include, but is not limited to, manganese chloride, manganese sulfate, manganese carbonate, manganese nitrate, manganese bromide, manganese iodide, manganese hydroxide, manganese fluoride, manganese oxide, manganese peroxide, manganese phosphate, manganese sulfide, manganese nitrate hexahydrate, manganese thiosulfate, manganese formate, manganese propionate, manganese butyrate, manganese malate, manganese tartrate, manganese lactate, manganese citrate, manganese gluconate, manganese acetate monohydrate, manganese pyrophosphate, manganese vanadate, manganese metavanadate, manganese molybdate, manganese tungstate, and manganese silicate. In a preferred embodiment, the manganese salt is manganese acetate tetrahydrate.

In some embodiments, copper salt may include, but is not limited to, copper chloride, copper sulfate, copper nitrate, copper carbonate, copper bromide, copper iodide, copper oxide, copper hydroxide, copper fluoride, copper pyrophosphate, copper formate, copper propionate, copper butyrate, copper malate, copper tartrate, copper lactate, copper citrate, copper gluconate, copper metavanadate, copper vanadate, copper molybdate, copper tungstate, copper silicate, copper thiocyanate, copper selenate, copper chromate, copper iodate, copper phosphate, and copper arsenate. In a preferred embodiment, the copper salt is copper acetate monohydrate.

In some embodiments, tartaric acid is used as a chelating agent. Tartaric acid includes natural and commercial forms of the acid. In some embodiments, tartaric acid is D-tartaric acid, L-tartaric acid, achiral tartaric acid or racemic mixture of D- and L-tartaric acid forms. In alternate embodiments, at least one hydroxyalkyl carboxylic acid selected from the group consisting of citric acid, tartaric acid, malic acid, mandelic acid and 12-hydroxystearic acid can also be used be used as a chelating agent. In some embodiments, the chelating agent is a combination of citric acid, tartaric acid, malic acid, mandelic acid and 12-hydroxystearic acid or variations of one or more hydroxyalkyl carboxylic acids.

In some embodiments, the chelating agent is selected from a group consisting of one or more of isosteric acid, isocitric acid, aconitic acid, tricarboxylic acid, carboxylic acid, dicarboxylic acid, tricarboxylic acid, aminopolycarboxylic acid and polycarboxylic acid. In some embodiments, the carboxylic acid includes saturated dicarboxylic acids and unsaturated dicarboxylic acids. In some embodiments, the saturated dicarboxylic acids include adipic acid, and succinic acid. The unsaturated dicarboxylic acids include fumaric acid, glutaconic acid, muconic acid, and citraconic acid. In some embodiments, the chelating agent are one or more of disodium edetate, trisodium edetate, sodium citrate, sodium tartarate, lactic acid, sodium polyphosphate, sodium metaphosphate or gluconic acid, and salicylic acid.

In some embodiments, concentration of the tartaric acid in the reaction mixture may range from 100 to 300 g/L, 150 to 250 g/L, preferably 190 to 200 g/L, including 190-191 g/L, 191-192 g/L, 192-193 g/L, 193-194 g/L, 194-195 g/L, 195-196 g/L, 196-197 g/L, 197-198 g/L, 198-199 g/L, 199-200 g/L, 190-192 g/L, 191-193 g/L, 192-194 g/L, 193-195 g/L, 194-196 g/L, 195-197 g/L, 196-198 g/L, 197-199 g/L, 198-200 g/L, 190-193 g/L, 191-194 g/L, 192-195 g/L, 193-196 g/L, 194-197 g/L, 195-198 g/L, 196-199 g/L, 197-200 g/L, 190-194 g/L, 191-195 g/L, 192-196 g/L. In a preferred embodiment, the concentration of the tartaric acid in the reaction mixture is 195 g/L.

In some embodiments, concentration of the magnesium nitrate hexahydrate in the reaction mixture may range from 65 to 135 g/L, 85 to 115 g/L, preferably 95 to 105 g/L, including 95-96 g/L, 96-97 g/L, 97-98 g/L, 98-99 g/L, 99-100 g/L, 100-101 g/L, 101-102 g/L, 102-103 g/L, 103-104 g/L, 104-105 g/L, 95-97 g/L, 96-98 g/L, 97-99 g/L, 98-100 g/L, 99-101 g/L, 100-102 g/L, 101-103 g/L, 102-104 g/L, 103-105 g/L, 95-98 g/L, 96-99 g/L, 97-100 g/L, 98-101 g/L, 99-102 g/L, 100-103 g/L, 101-104 g/L, 102-105 g/L, 95-99 g/L, 96-100 g/L, 97-101 g/L. In a preferred embodiment, the concentration of the magnesium nitrate hexahydrate in the reaction mixture is 100 g/L.

In some embodiments, concentration of the manganese acetate tetrahydrate in the reaction mixture may range from 65 to 135 g/L, 85 to 115 g/L, preferably 95 to 105 g/L including 95-96 g/L, 96-97 g/L, 97-98 g/L, 98-99 g/L, 99-100 g/L, 100-101 g/L, 101-102 g/L, 102-103 g/L, 103-104 g/L, 104-105 g/L, 95-97 g/L, 96-98 g/L, 97-99 g/L, 98-100 g/L, 99-101 g/L, 100-102 g/L, 101-103 g/L, 102-104 g/L, 103-105 g/L, 95-98 g/L, 96-99 g/L, 97-100 g/L, 98-101 g/L, 99-102 g/L, 100-103 g/L, 101-104 g/L, 102-105 g/L, 95-99 g/L, 96-100 g/L, 97-101 g/L. In a preferred embodiment, the concentration of the manganese acetate tetrahydrate in the reaction mixture is 100 g/L.

In some embodiments, concentration of the copper acetate monohydrate in the reaction mixture may range from 65 to 135 g/L, 85 to 115 g/L, preferably 95 to 105 g/L, including 95-96 g/L, 96-97 g/L, 97-98 g/L, 98-99 g/L, 99-100 g/L, 100-101 g/L, 101-102 g/L, 102-103 g/L, 103-104 g/L, 104-105 g/L, 95-97 g/L, 96-98 g/L, 97-99 g/L, 98-100 g/L, 99-101 g/L, 100-102 g/L, 101-103 g/L, 102-104 g/L, 103-105 g/L, 95-98 g/L, 96-99 g/L, 97-100 g/L, 98-101 g/L, 99-102 g/L, 100-103 g/L, 101-104 g/L, 102-105 g/L, 95-99 g/L, 96-100 g/L, 97-101 g/L. In a preferred embodiment, the concentration of copper acetate monohydrate in the reaction mixture is 100 g/L.

In some embodiments, the tartaric acid solution was added to the metal nitrate solution with continuous stirring for a duration ranging from 1 to 120 min, 5 to 80 min, preferably 10 min to 60 min, including 10-11 min, 11-12 min, 12-13 min, 13-14 min, 14-15 min, 15-16 min, 16-17 min, 17-18 min, 18-19 min, 19-20 min, 20-21 min, 21-22 min, 22-23 min, 23-24 min, 24-25 min, 25-26 min, 26-27 min, 27-28 min, 28-29 min, 29-30 min, 30-31 min, 31-32 min, 32-33 min, 33-34 min, 34-35 min, 35-36 min, 36-37 min, 37-38 min, 38-39 min, 39-40 min. In a preferred embodiment, the tartaric acid solution was added to the metal nitrate solution with continuous stirring for 30 min.

At step 54, the method 50 includes adding polyethylene glycol 400 to the reaction mixture to form a stabilized mixture and stirring at 250° C. until complete evaporation of water, forming a solid. In some embodiments, the concentration of polyethylene glycol 400 in the stabilized mixture ranges from 25 to 115 mL/L, 55 to 85 mL/L, preferably 65 to 75 mL/L, including 65-66 mL/L, 66-67 mL/L, 67-68 mL/L, 68-69 mL/L, 69-70 mL/L, 70-71 mL/L, 71-72 mL/L, 72-73 mL/L, 73-74 mL/L, 74-75 mL/L, 65-67 mL/L, 66-68 mL/L, 67-69 mL/L, 68-70 mL/L, 69-71 mL/L, 70-72 mL/L, 71-73 mL/L, 72-74 mL/L, 73-75 mL/L, 65-68 mL/L, 66-69 mL/L, 67-70 mL/L, 68-71 mL/L, 69-72 mL/L, 70-73 mL/L, 71-74 mL/L, 72-75 mL/L, 65-69 mL/L, 66-70 mL/L, 67-71 mL/L. In a preferred embodiment, the concentration of polyethylene glycol 400 in the stabilized mixture is 60 mL/L.

At step 56, the method 50 includes calcining the solid at a temperature in a range from 550 to 850° C. for 2 to 4 hours to form the $CuMg_{0.5}Mn_{1.5}O_4/CuO$ nanocomposite material. The calcination is carried out by heating it to a high temperature under a restricted supply of ambient oxygen. This is performed to remove impurities or volatile substances and to incur thermal decomposition. Typically, the calcination is carried out in a furnace, preferably equipped with a temperature control system.

In some embodiments, the solid is calcined at a temperature ranging from 550 to 650° C., preferably 575 to 625° C., including 575-576° C., 576-577° C., 577-578° C., 578-579° C., 579-580° C., 580-581° C., 581-582° C., 582-583° C., 583-584° C., 584-585° C., 585-586° C., 586-587° C., 587-588° C., 588-589° C., 589-590° C., 590-591° C., 591-592° C., 592-593° C., 593-594° C., 594-595° C., 595-596° C., 596-597° C., 597-598° C., 598-599° C., 599-600° C., 600-601° C., 601-602° C., 602-603° C., 603-604° C., 604-605° C. to form the $CuMg_{0.5}Mn_{1.5}O_4/CuO$ nanocomposite material. In a preferred embodiment, the solid is calcined at 600° C. to form the $CuMg_{0.5}Mn_{1.5}O_4/CuO$ nanocomposite material.

In some embodiments, the solid is calcined for a duration ranging from 1 to 6 hours, preferably 2 to 4 hours, including 2-2.1 hours, 2.1-2.2 hours, 2.2-2.3 hours, 2.3-2.4 hours, 2.4-2.5 hours, 2.5-2.6 hours, 2.6-2.7 hours, 2.7-2.8 hours, 2.8-2.9 hours, 2.9-3 hours, 3-3.1 hours, 3.1-3.2 hours, 3.2-3.3 hours, 3.3-3.4 hours, 3.4-3.5 hours, 3.5-3.6 hours, 3.6-3.7 hours, 3.7-3.8 hours, 3.8-3.9 hours, 3.9-4 hours, 2-2.5 hours, 2.5-3 hours, 3-3.5 hours, 3.5-4 hours, 2-3 hours, 3-4 hours, 2.1-2.6 hours, 2.6-3.1 hours, 3.1-3.6 hours, 2.2-3.2 hours to form the $CuMg_{0.5}Mn_{1.5}O_4/CuO$ nanocomposite material. In a preferred embodiment, the solid is calcined for 3 hours to form the $CuMg_{0.5}Mn_{1.5}O_4/CuO$ nanocomposite material.

In one or more embodiments, when calcined at 600° C. for 3 hours, the $CuMg_{0.5}Mn_{1.5}O_4/CuO$ has a a granular morphology with granular particles having an average diameter ranging from 75 to 160 nm, 110 to 150 nm, preferably 130 to 140 nm. Specific subranges include 75-80 nm, 80-85 nm, 85-90 nm, 90-95 nm, 95-100 nm, 100-105 nm, 105-110 nm, 110-115 nm, 115-120 nm, 120-125 nm, 125-130 nm, 130-135 nm, 135-140 nm, 140-145 nm, 145-150 nm, 150-155 nm, and 155-160 nm. In a preferred embodiment when calcined at 600° C. for 3 hours, the $CuMg_{0.5}Mn_{1.5}O_4/CuO$ has a granular morphology with granular particles having an average diameter around 137 nm.

In some embodiments, the solid is calcined at a temperature ranging from 750 to 850° C., preferably 775 to 825° C., including 775-776° C., 776-777° C., 777-778° C., 778-779° C., 779-780° C., 780-781° C., 781-782° C., 782-783° C., 783-784° C., 784-785° C., 785-786° C., 786-787° C., 787-788° C., 788-789° C., 789-790° C., 790-791° C., 791-792° C., 792-793° C., 793-794° C., 794-795° C., 795-796° C., 796-797° C., 797-798° C., 798-799° C., 799-800° C., 800-801° C., 801-802° C., 802-803° C., 803-804° C., 804-805° C. to form the $CuMg_{0.5}Mn_{1.5}O_4/CuO$ nanocomposite material. In a preferred embodiment, the solid is calcined at 800° C. to form the $CuMg_{0.5}Mn_{1.5}O_4/CuO$ nanocomposite material.

In some embodiments, the solid is calcined for a duration ranging from 1 to 6 hours, preferably 2 to 4 hours, including 2-2.1 hours, 2.1-2.2 hours, 2.2-2.3 hours, 2.3-2.4 hours, 2.4-2.5 hours, 2.5-2.6 hours, 2.6-2.7 hours, 2.7-2.8 hours, 2.8-2.9 hours, 2.9-3 hours, 3-3.1 hours, 3.1-3.2 hours, 3.2-3.3 hours, 3.3-3.4 hours, 3.4-3.5 hours, 3.5-3.6 hours, 3.6-3.7 hours, 3.7-3.8 hours, 3.8-3.9 hours, 3.9-4 hours, 2-2.5 hours, 2.5-3 hours, 3-3.5 hours, 3.5-4 hours, 2-3 hours, 3-4 hours, 2.1-2.6 hours, 2.6-3.1 hours, 3.1-3.6 hours, 2.2-3.2 hours to form the $CuMg_{0.5}Mn_{1.5}O_4/CuO$ nanocomposite material. In a preferred embodiment, the solid is calcined for 3 hours to form the $CuMg_{0.5}Mn_{1.5}O_4/CuO$ nanocomposite material.

In one or more embodiments, when calcined at 800° C. for 3 hours, the $CuMg_{0.5}Mn_{1.5}O_4/CuO$ has a a granular morphology with granular particles having an average diameter ranging from 300 to 475 nm, 350 to 450 nm, preferably 390 to 410 nm. Specific subranges include 300-305 nm, 305-310 nm, 310-315 nm, 315-320 nm, 320-325 nm, 325-330 nm, 330-335 nm, 335-340 nm, 340-345 nm, 345-350 nm, 350-355 nm, 355-360 nm, 360-365 nm, 365-370 nm, 370-375 nm, 375-380 nm, 380-385 nm, 385-390 nm, 390-395 nm, 395-400 nm, 400-405 nm, 405-410 nm, 410-415 nm, 415-420 nm, 420-425 nm, 425-430 nm, 430-435 nm, 435-440 nm, 440-445 nm, 445-450 nm, 450-455 nm, 455-460 nm, 460-465 nm, 465-470 nm, and 470-475 nm. In a preferred embodiment when calcined at 800° C. for 3 hours, the $CuMg_{0.5}Mn_{1.5}O_4/CuO$ has a granular morphology with granular particles having an average diameter around 400 nm.

EXAMPLES

The following examples demonstrate a $CuMg_{0.5}Mn_{1.5}O_4/CuO$ nanocomposite material.

The examples are provided solely for illustration and are not to be construed as limitations of the present disclosure, as many variations thereof are possible without departing from the spirit and scope of the present disclosure.

Figure 1B:
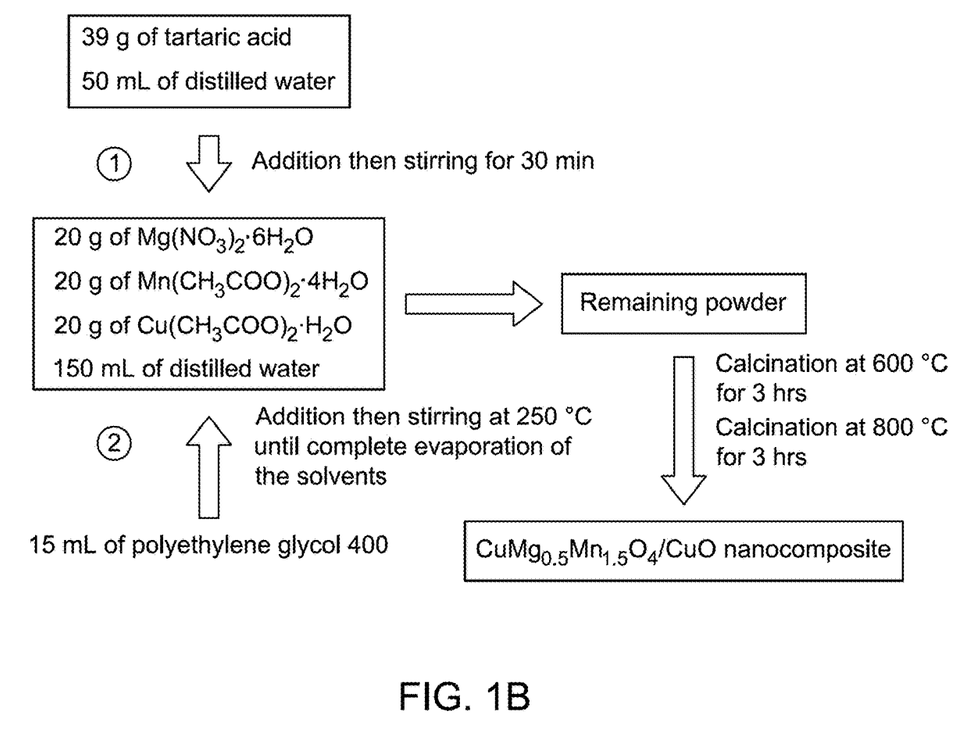
FIG. 1B shows experimental steps for the production of $CuMg_{0.5}Mn_{1.5}O_4/CuO$ nanocomposite material, according to certain embodiments.

Example 1: Synthesis of $CuMg_{0.5}Mn_{1.5}O_4/CuO$ Nanocomposite Material Using Pechini Sol-Gel Method The $CuMg_{0.5}Mn_{1.5}O_4/CuO$ nanocomposite material was synthesized using the Pechini sol-gel method, as illustrated in FIG. 1B. Initially, 39 g of tartaric acid was dissolved in 50 mL of distilled water. In a separate container, 20 g of magnesium nitrate hexahydrate ($Mg(NO_3)_2 \cdot 6H_2O$), 20 g of manganese acetate tetrahydrate ($Mn(CH_3COO)_2 \cdot 4H_2O$), and 20 g of copper acetate monohydrate ($Cu(CH_3COO)_2 \cdot H_2O$) were dissolved in 150 mL of distilled water. The tartaric acid solution was then added to the mixed metal ion solution with continuous stirring for 30 min. Following this, 15 mL of polyethylene glycol 400 was introduced to the mixture, and the resulting solution was stirred continuously at 250° C. until complete evaporation of the solvents occurred. The obtained powder was then calcinated at 600 and 800° C. for 3 hrs to form the final $CuMg_{0.5}Mn_{1.5}O_4/CuO$ nanocomposite.

Figure 2A:
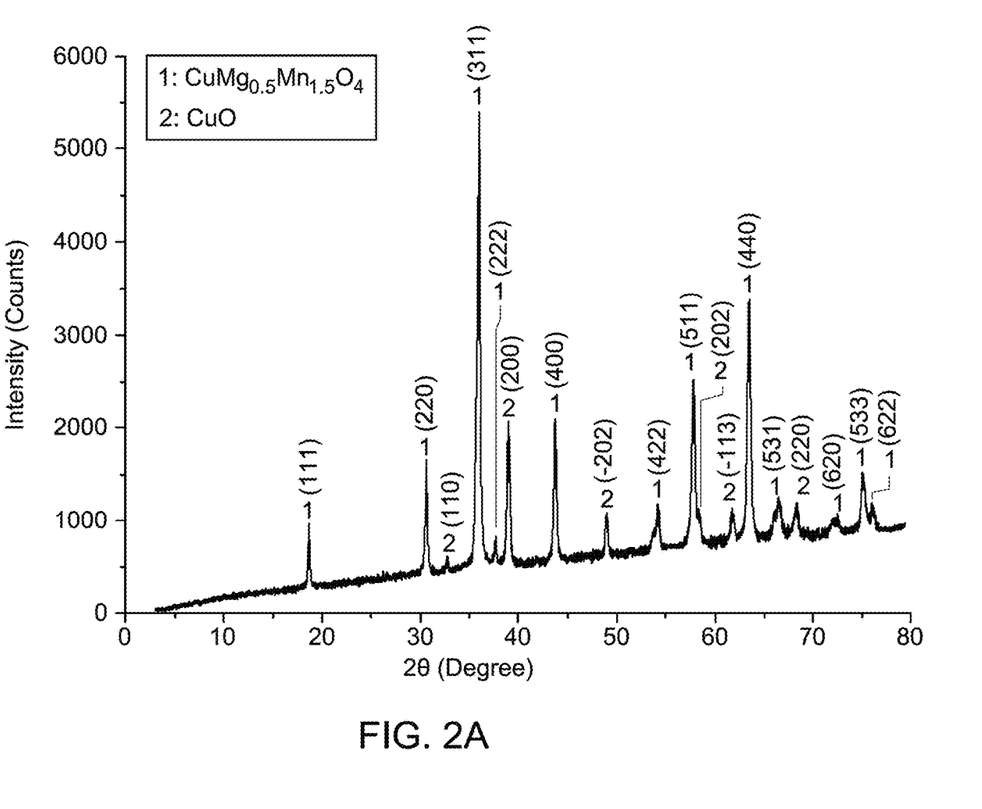
FIG. 2A illustrates X-ray diffraction (XRD) pattern of $CuMg_{0.5}Mn_{1.5}O_4/CuO$ nanocomposite material synthesized at 600° C., according to certain embodiments.
Figure 2B:
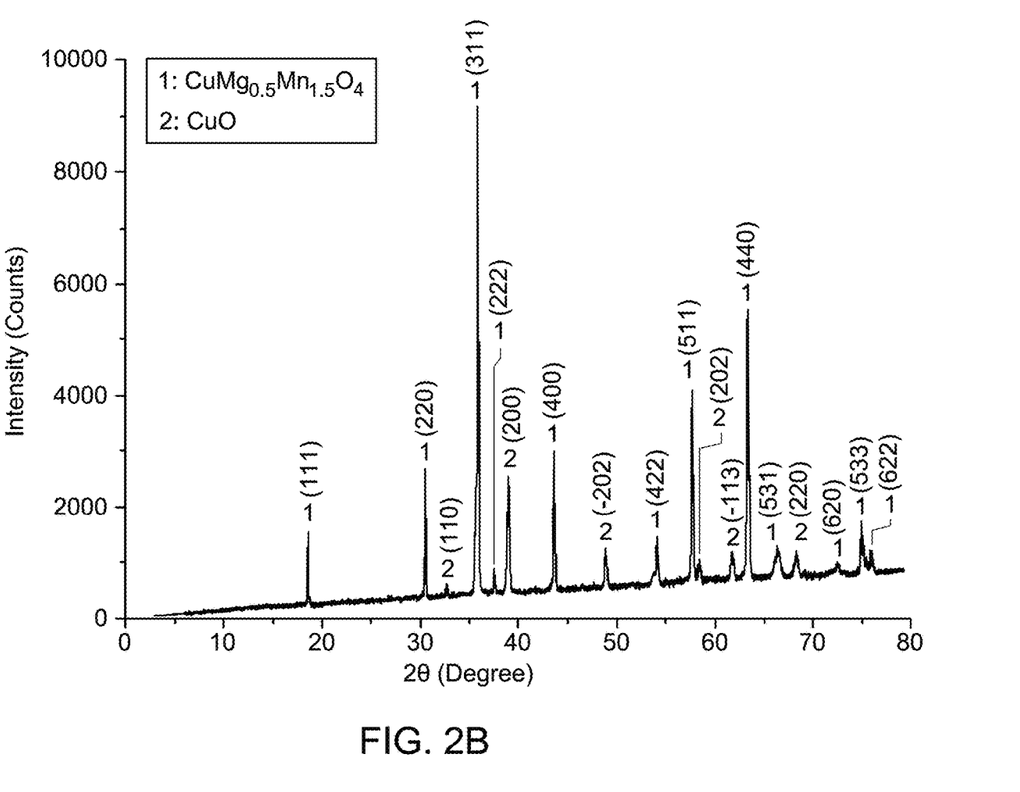
FIG. 2B shows an XRD pattern for the $CuMg_{0.5}Mn_{1.5}O_4/CuO$ nanocomposite material synthesized at 800° C. using Pechini sol-gel method, according to certain embodiments.

The X-ray diffraction (XRD) patterns of $CuMg_{0.5}Mn_{1.5}O_4/CuO$ nanocomposite synthesized via the Pechini sol-gel method at 600° C. and 800° C. are presented in FIG. 2A and FIG. 2B, respectively. The $CuMg_{0.5}Mn_{1.5}O_4/CuO$ nanocomposite material synthesized at 600° C. exhibits the crystalline phases of copper magnesium manganese oxide ($CuMg_{0.5}Mn_{1.5}O_4$) with a cubic structure (JCPDS No. 00-033-0468) and copper oxide (CuO) with a monoclinic structure (JCPDS No. 01-085-7183), achieving an average crystallite size of 60.78 nm. In contrast, the nanocomposite synthesized at 800° C. shows the same crystalline phases but with an increased average crystallite size of 77.62 nm. The diffraction peaks for $CuMg_{0.5}Mn_{1.5}O_4$ appear at 2θ values of 18.68°, 30.53°, 35.88°, 37.67°, 43.76°, 54.14°, 57.82°, 63.47°, 66.41°, 72.19°, 75.13°, and 76.08°, corresponding to the (111), (220), (311), (222), (400), (422), (511), (440), (531), (620), (533), and (622) planes, respectively. For CuO, diffraction peaks are observed at 2θ values of 32.63°, 38.92°, 48.90°, 58.33°, 61.69°, and 68.19°, corresponding to the (110), (200), (−202), (202), (−113), and (220) planes, respectively. The increase in average crystallite size from 600° C. to 800° C. can be attributed to enhanced crystal growth at the higher temperature, which facilitates atomic mobility and promotes the coalescence of smaller crystallites into larger ones.

Figure 3A:
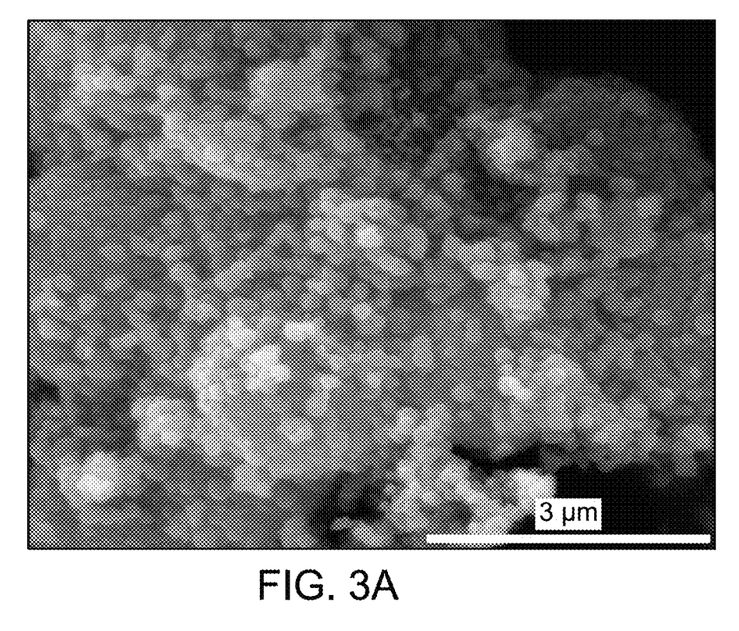
FIG. 3A shows scanning electron microscope (SEM) images of $CuMg_{0.5}Mn_{1.5}O_4/CuO$ nanocomposite material synthesized at 600° C., according to certain embodiments.
Figure 3B:
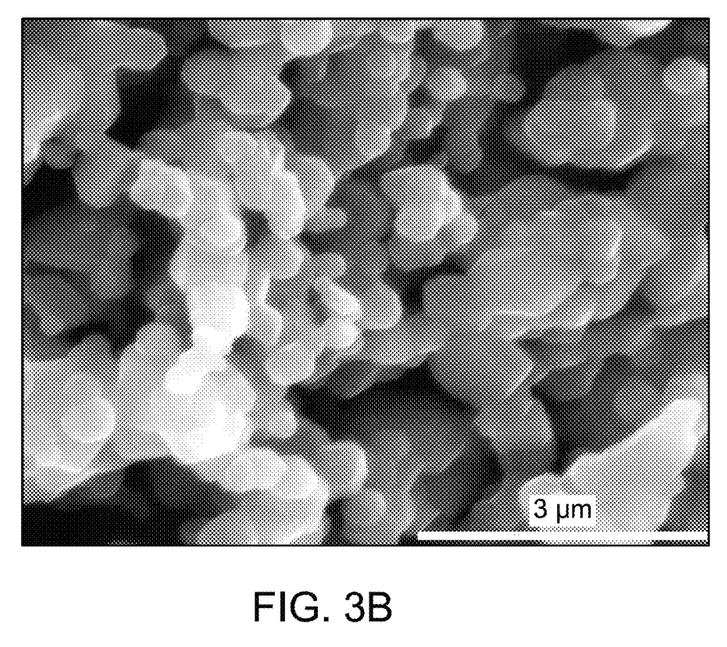
FIG. 3B shows SEM images of the $CuMg_{0.5}Mn_{1.5}O_4/CuO$ nanocomposite material synthesized at 800° C. using the Pechini sol-gel method, according to certain embodiments.

FIG. 3A and FIG. 3B shows scanning electron microscope (SEM) images of the $CuMg_{0.5}Mn_{1.5}O_4/CuO$ nanocomposite synthesized via the Pechini sol-gel method at 600 and 800° C., respectively. In FIG. 3A, corresponding to the synthesis at 600° C., the nanocomposite exhibits a granular morphology with relatively smaller and closely packed particles. In contrast, FIG. 3B, which represents the sample synthesized at 800° C., shows larger and more distinct granular shapes, indicating an increase in grain size due to the higher synthesis temperature. The observed particle shapes in both images can be described as spherical or quasi-spherical. The average grain sizes of the $CuMg_{0.5}Mn_{1.5}O_4/CuO$ nanocomposite synthesized at 600 and 800° C. are 136.68 nm and 399.69 nm, respectively, reflecting the enhanced crystal growth at elevated temperatures that promote the formation of larger particles. These results indicate that the synthesis temperature has a notable impact on the microstructural characteristics of the nanocomposite, influencing the overall morphology and grain size.

Figure 4A:
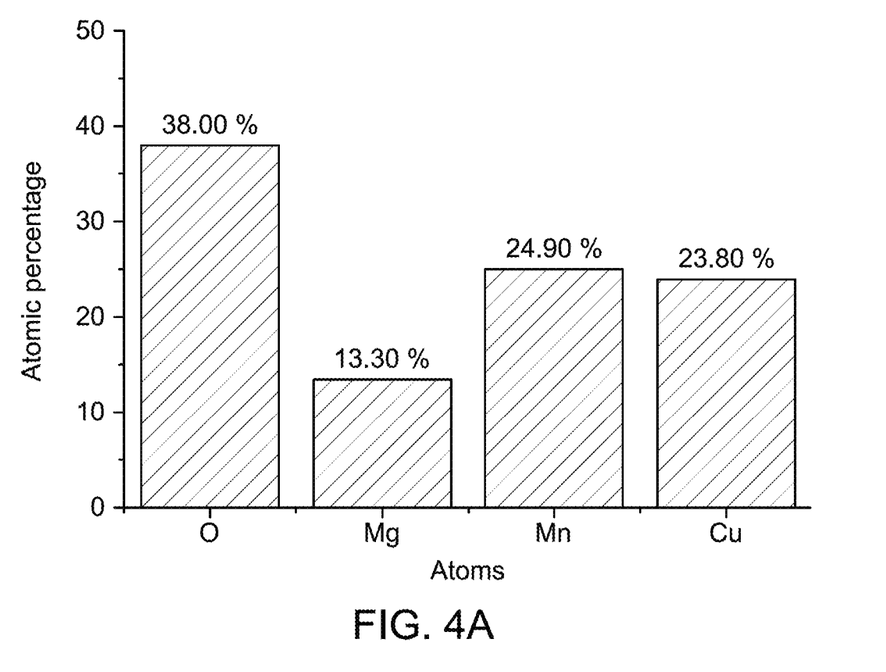
FIG. 4A is a graph showing the atomic percentage distribution of elements in the $CuMg_{0.5}Mn_{1.5}O_4/CuO$ nanocomposite material synthesized at 600° C., as determined by energy-dispersive X-ray spectroscopy (EDX) analysis, according to certain embodiments.
Figure 4B:
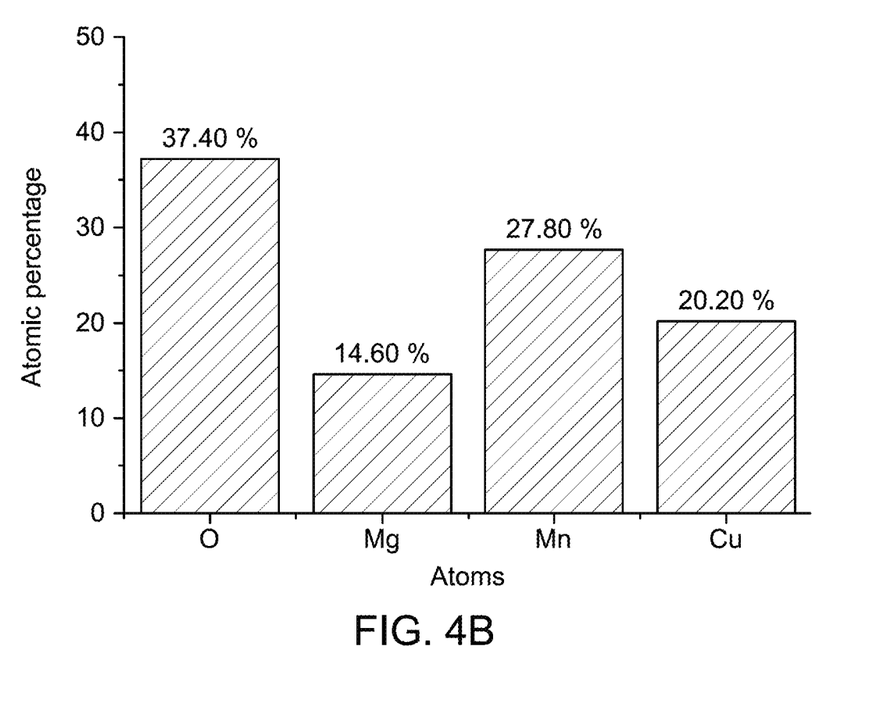
FIG. 4B is a graph illustrating the atomic percentage distribution of elements in the $CuMg_{0.5}Mn_{1.5}O_4/CuO$ nanocomposite material synthesized at 800° C., as determined by EDX analysis, according to certain embodiments.

FIG. 4A and FIG. 4B presents the atomic percentage distribution of elements in the $CuMg_{0.5}Mn_{1.5}O_4/CuO$ nanocomposite synthesized via the Pechini sol-gel method at 600 and 800° C., respectively, using energy-dispersive X-ray spectroscopy (EDX) analysis. At 600° C., the nanocomposite exhibits atomic percentages of 38.00 at. % oxygen, 13.30 at. % magnesium, 24.90 at. % manganese, and 23.80 at. % copper. At 800° C., the atomic percentages change to 37.40 at. % oxygen, 14.60 at. % magnesium, 27.80 at. % manganese, and 20.20 at. % copper. The increase in manganese and magnesium percentages at the higher temperature, along with a slight decrease in oxygen and copper, suggests enhanced stability and incorporation of magnesium and manganese within the nanocomposite matrix at elevated temperatures. This shift could be attributed to the improved crystallinity and phase stability of $CuMg_{0.5}Mn_{1.5}O_4$ at 800° C., which facilitates the retention of these elements and may lead to minor volatilization or redistribution of copper and oxygen within the composite structure. This compositional adjustment highlights the effect of synthesis temperature on elemental distribution, which is helps tailor the material's properties for specific applications.

The $CuMg_{0.5}Mn_{1.5}O_4$ nanocomposite material's thermal stability and multi-phase composition position it as an advanced material for use in adsorption, catalysis, and other high-performance applications across environmental and industrial sectors.

To summarize, the present disclosure presents a $CuMg_{0.5}Mn_{1.5}O_4$ nanocomposite synthesized using the Pechini sol-gel method, offering advancements in material science. The method employs a cost-effective and scalable process to produce the nanocomposite with highly controlled crystallinity and morphology, addressing challenges found in conventional synthesis techniques. The X-ray diffraction (XRD) analysis confirms the presence of crystalline phases of copper magnesium manganese oxide with a cubic structure and copper oxide with a monoclinic structure, with average crystallite sizes of 60.78 nm and 77.62 nm for samples synthesized at 600° C. and 800, respectively. Scanning electron microscopy (SEM) reveals granular morphologies with average grain sizes of 136.68 nm and 399.69 nm at the respective temperatures, demonstrating the effect of calcination temperature on grain growth and overall microstructural characteristics. Energy-dispersive X-ray spectroscopy (EDX) analysis highlights the elemental distribution within the nanocomposite matrix, showing enhanced incorporation of manganese and magnesium at elevated temperatures, contributing to improved stability and performance. The combination of these findings demonstrates the properties of this nanocomposite, which not only simplifies the fabrication process but also achieves enhanced structural and compositional characteristics, making it a promising material for advanced applications. The present disclosure provides precise control over the synthesis parameters to tailor the nanocomposite's properties, filling a gap in developing mixed metal oxide materials.

Numerous modifications and variations of the present disclosure are possible in light of the above teachings. It is, therefore, to be understood that within the scope of the appended claims, the invention may be practiced otherwise than as specifically described herein.

The invention claimed is:
1. A $CuMg_{0.5}Mn_{1.5}O_4/CuO$ nanocomposite material, comprising:
  a cubic $CuMg_{0.5}Mn_{1.5}O_4$ crystalline phase; and
  a monoclinic CuO crystalline phase;

wherein an average crystallite size of the $CuMg_{0.5}Mn_{1.5}O_4/CuO$ nanocomposite material is in a range from 50 to 90 nm, wherein the atomic concentration of Cu in the $CuMg_{0.5}Mn_{1.5}O_4/CuO$ nanocomposite material is in a range from 15 to 30 at. %, the atomic concentration of Mn in the $CuMg_{0.5}Mn_{1.5}O_4/CuO$ nanocomposite material is in a range from 20 to 30 at. %, and the atomic concentration of Mg in the $CuMg_{0.5}Mn_{1.5}O_4/CuO$ nanocomposite material is in a range from 10 to 20 at. % based on the total number of atoms in the $CuMg_{0.5}Mn_{1.5}O_4/CuO$ nanocomposite material.

2. The $CuMg_{0.5}Mn_{1.5}O_4/CuO$ nanocomposite material of claim 1, wherein the average crystallite size of the $CuMg_{0.5}Mn_{1.5}O_4/CuO$ nanocomposite material is in a range from 50 to 70 nm.

3. The $CuMg_{0.5}Mn_{1.5}O_4/CuO$ nanocomposite material of claim 2, wherein the average crystallite size of the $CuMg_{0.5}Mn_{1.5}O_4/CuO$ nanocomposite material is in a range from 55 to 65 nm.

4. The $CuMg_{0.5}Mn_{1.5}O_4/CuO$ nanocomposite material of claim 1, wherein the average crystallite size of the $CuMg_{0.5}Mn_{1.5}O_4/CuO$ nanocomposite material is in a range from 65 to 85 nm.

5. The $CuMg_{0.5}Mn_{1.5}O_4/CuO$ nanocomposite material of claim 4, wherein the average crystallite size of the $CuMg_{0.5}Mn_{1.5}O_4/CuO$ nanocomposite material is in a range from 72 to 82 nm.

6. The $CuMg_{0.5}Mn_{1.5}O_4/CuO$ nanocomposite material of claim 1, wherein the $CuMg_{0.5}Mn_{1.5}O_4/CuO$ nanocomposite material has a granular morphology comprising granular particles with an average diameter in a range from 75 to 475 nm.

7. The $CuMg_{0.5}Mn_{1.5}O_4/CuO$ nanocomposite material of claim 6, wherein the $CuMg_{0.5}Mn_{1.5}O_4/CuO$ nanocomposite material has a granular morphology comprising granular particles with an average diameter in a range from 100 to 160 nm.

8. The $CuMg_{0.5}Mn_{1.5}O_4/CuO$ nanocomposite material of claim 7, wherein the $CuMg_{0.5}Mn_{1.5}O_4/CuO$ nanocomposite material has a granular morphology comprising granular particles with an average diameter in a range from 130 to 140 nm.

9. The $CuMg_{0.5}Mn_{1.5}O_4/CuO$ nanocomposite material of claim 6, wherein the $CuMg_{0.5}Mn_{1.5}O_4/CuO$ nanocomposite material has a granular morphology comprising granular particles with an average diameter in a range from 350 to 450 nm.

10. The $CuMg_{0.5}Mn_{1.5}O_4/CuO$ nanocomposite material of claim 9, wherein the $CuMg_{0.5}Mn_{1.5}O_4/CuO$ nanocomposite material has a granular morphology comprising granular particles with an average diameter in a range from 390 to 410 nm.

11. The $CuMg_{0.5}Mn_{1.5}O_4/CuO$ nanocomposite material of claim 1, wherein the atomic concentration of copper in the $CuMg_{0.5}Mn_{1.5}O_4/CuO$ nanocomposite material is in a range from 18 to 25 at. %, the atomic concentration of manganese in the $CuMg_{0.5}Mn_{1.5}O_4/CuO$ nanocomposite material is in a range from 22 to 29 at. %, and the atomic concentration of magnesium in the $CuMg_{0.5}Mn_{1.5}O_4/CuO$ nanocomposite material is in a range from 11 to 17 at. %.

12. The $CuMg_{0.5}Mn_{1.5}O_4/CuO$ nanocomposite material of claim 11, wherein the atomic concentration of copper in the $CuMg_{0.5}Mn_{1.5}O_4/CuO$ nanocomposite material is in a range from 23 to 25 at. %, the atomic concentration of manganese in the $CuMg_{0.5}Mn_{1.5}O_4/CuO$ nanocomposite material is in a range from 24 to 26 at. %, and the atomic concentration of magnesium in the $CuMg_{0.5}Mn_{1.5}O_4/CuO$ nanocomposite material is in a range from 12.5 to 13.75 at. %.

13. The $CuMg_{0.5}Mn_{1.5}O_4/CuO$ nanocomposite material of claim 11, wherein the atomic concentration of copper in the $CuMg_{0.5}Mn_{1.5}O_4/CuO$ nanocomposite material is in a range from 19 to 21 at. %, the atomic concentration of manganese in the $CuMg_{0.5}Mn_{1.5}O_4/CuO$ nanocomposite material is in a range from 27 to 29 at. %, and the atomic concentration of magnesium in the $CuMg_{0.5}Mn_{1.5}O_4/CuO$ nanocomposite material is in a range from 14 to 15.5 at. %.

14. A method for making the $CuMg_{0.5}Mn_{1.5}O_4/CuO$ nanocomposite material of claim 1, comprising:

adding a tartaric acid solution to a solution of magnesium nitrate hexahydrate ($Mg(NO_3)_2 \cdot 6H_2O$), manganese acetate tetrahydrate ($Mn(CH_3COO)_2 \cdot 4H_2O$), and copper acetate monohydrate ($Cu(CH_3COO)_2 \cdot H_2O$) under stirring to form a reaction mixture;

adding polyethylene glycol 400 to the reaction mixture to form a stabilized mixture and stirring at 250° C. until complete evaporation of water, forming a solid; and calcining the solid at a temperature in a range from 550 to 850° C. for 2 to 4 hours to form the $CuMg_{0.5}Mn_{1.5}O_4/CuO$ nanocomposite material.

15. The method of claim 14, wherein the solid is calcined at a temperature in a range from 575 to 625° C. for 2 to 4 hours to form the $CuMg_{0.5}Mn_{1.5}O_4/CuO$ nanocomposite material.

16. The method of claim 15, wherein the solid is calcined at 600° C. for 3 hours to form the $CuMg_{0.5}Mn_{1.5}O_4/CuO$ nanocomposite material.

17. The method of claim 14, wherein the solid is calcined at a temperature in a range from 775 to 825° C. for 2 to 4 hours to form the $CuMg_{0.5}Mn_{1.5}O_4/CuO$ nanocomposite material.

18. The method of claim 17, wherein the solid is calcined at 800° C. for 3 hours to form the $CuMg_{0.5}Mn_{1.5}O_4/CuO$ nanocomposite material.

19. The method of claim 14, wherein the concentration of tartaric acid in the reaction mixture is in a range from 190 to 200 g/L, the concentration of $Mg(NO_3)_2 \cdot 6H_2O$ in the reaction mixture is in a range from 95 to 105 g/L, the concentration of $Mn(CH_3COO)_2 \cdot 4H_2O$ in the reaction mixture is in a range from 95 to 105 g/L, and the concentration of $Cu(CH_3COO)_2 \cdot H_2O$ in the reaction mixture is in a range from 95 to 105 g/L.

20. The method of claim 14, wherein the concentration of polyethylene glycol 400 in the stabilized mixture is in a range from 65 to 75 ml per liter of stabilized mixture.

* * * * *